Figure 1:
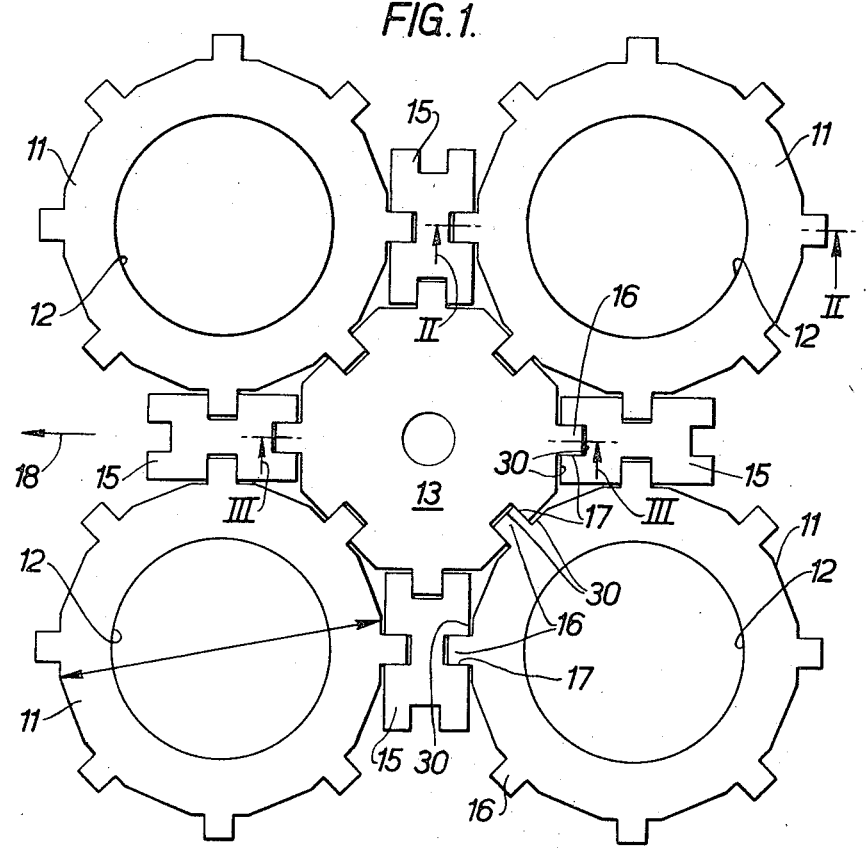

Sept. 19, 1967        G. W. TRIGGS        3,342,693

GRAPHITE BRICK STRUCTURES

Filed Nov. 26, 1965        2 Sheets-Sheet 1

3,342,693
GRAPHITE BRICK STRUCTURES
Geoffrey William Triggs, Stockton Heath, Warrington, England, assignor to United Kingdom Atomic Energy Authority, London, England
Filed Nov. 26, 1965, Ser. No. 509,974
Claims priority, application Great Britain, Dec. 4, 1964, 49,530/64
3 Claims. (Cl. 176—84)

This invention relates to graphite brick structures serving as the moderator of a nuclear reactor.

Whilst undergoing neutron irradiation in a reactor graphite bricks may undergo a change in dimensions. The amount of contraction depends particularly on the integrated neutron flux received by each brick and the temperature history of the graphite.

Because of variations in the neutron flux and temperature gradients within a single brick the whole brick neither expands nor contracts at a uniform rate. The result of this is twofold. Firstly, internal strains are set up within the brick, the strains being analogous to those set up in a thick walled cylinder subjected to a temperature gradient across the wall. Secondly, one side of the brick may expand or contract more than the other side which will cause the brick to bow. Where the brick is one of a column a wedge shaped gap will tend to open between the bowed brick and its neighbour and the column will cease to be vertical. As the vertical alignment error that can be allowed is usually small horizontal forces have to be applied to the column to keep the bricks as nearly vertically aligned as possible. It has been calculated that in certain cases these forces, which may be carried by a system of keys and keyways, can be significantly high if steps are not taken to reduce them by suitable design.

According to the present invention a graphite brick moderator structure for a nuclear reactor comprises juxtaposed columns of graphite bricks, the bricks in each column being each engaged with their neighbours in the column by cooperating projection and recesses provided on adjacent faces of the bricks characterised in that the projections have a working surface of generally arcuate contour with a central minor portion forming a pair of parallel straight edges disposed so that a vertically contiguous brick can pivot about either of said straight edges.

In a column of bricks formed according to the invention the points of contact between neighbouring bricks, either or both of which have bowed, will be on one or other of the straight parallel edges. Such points of contact will always lie close to a single vertical plane (the distance separating the pair of parallel lines being much less than that of the width of the bricks) and consequently the horizontal restoring forces required will be substantially reduced.

This invention is applicable either to solid bricks or to bricks having channels through them.

Figure 2:
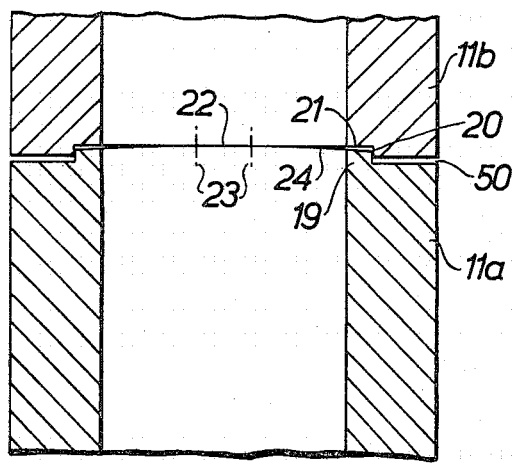
Figure 3:
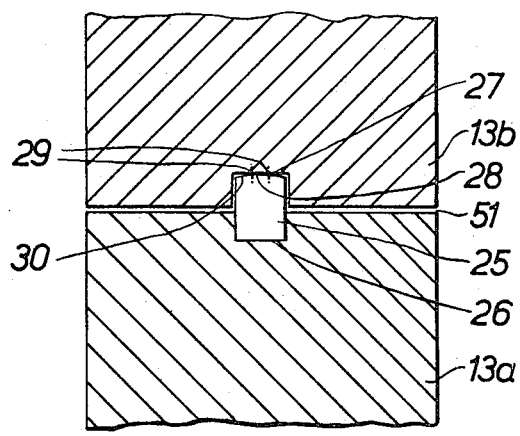

An embodiment of the invention will now be described, by way only of example, with reference to the accompanying drawings in which:

FIGURE 1 is a plan view,
FIGURE 2 is a sectional elevation on the line II—II of FIGURE 1,
FIGURE 3 is a sectional elevation on the line III—III of FIGURE 1.

The figures variously show a portion of a nuclear reactor graphite brick moderator structure for a nuclear reactor, comprising fuel channel bricks 11 (with bore 12), interstitial channel bricks 13 and spacer bricks 15. Each brick is linked to its neighbour radially by radial keying, typically a key 16 slidable in keyway 17 with end clearances 30. The spacer bricks 15 enable a relatively thin walled fuel channel brick to be used even when a relatively wide fuel lattice pitch is needed without having a single brick of great thickness which would, in use, be subject to sizable differential strains. The centre of the moderator structure lies in the direction of arrow 18.

FIGURE 2 shows a fuel element brick 11a having a projecting component 19 on which is seated a brick 11b with a groove 20 having a plane bearing surface 21. The component 19 has a symmetrical working surface comprising a central minor flattened portion 22 with parallel straight edges 23 and a major cylindrical outward portion 24. The bricks 11a and 11b are set up in the structure so that the edges 23 are perpendicular to the direction of arrow 18. A clearance 50 is provided between bricks 11a and 11b.

FIGURE 3 shows an interstitial brick 13a having a projecting component 25 in the form of a tile recessed into plane bottomed groove 26 in the brick 13a. The component 25 has seated on it a brick 13b by way of plane bottomed groove 27. The component 25 has a symmetrical working surface comprising a central minor flattened portion 28 with parallel straight edges 29 and a major cylindrical outward portion 30. The brick 13a is set up in the structure so that the edges 29 are perpendicular to the direction 18. A clearance 51 is provided between bricks 13a and b.

In constructing a graphite core structure with the bricks described above the flattened surface portions (22 and 28) of the components (19 and 25) allow the bricks to be stacked one upon another to form a reasonably stable structure. Radial keying 16 is inserted to provide horizontal alignment and restraint. In operation with the core bricks undergoing heating and irradiation the bricks may bow as previously described. Bowing will usually occur positively or negatively in the direction 18 (either towards or away from the centre of the core) and thus a brick (11b, 13b) will become supported by an edge (23, and 29) on its neighbour (11a, 13a) regardless of either one or both bricks bowing. As the separation of the pairs of edges is not great the loading provided by the keying 16 in a column will not be great since support points of bricks in the column lie close to a vertical line. Furthermore as no single brick in the core is excessively thick, considerable strains do not occur in the moderator structure as a whole.

I claim:
1. For a nuclear reactor a graphite brick moderator structure comprising juxtaposed columns of graphite bricks, the bricks in each column being each engaged with their neighbours in the column by co-operating projections and recesses provided on adjacent faces of the bricks, the projections having a curved working surface including a central minor portion defining a pair of parallel straight edges disposed so that a vertically contiguous brick can pivot about either of said straight edges.

2. A graphite brick moderator structure according to claim 1 wherein the projections in each column are orientated so that the parallel straight edges of each projection are normal to the plane including the central vertical axis of the moderator structure of the reactor and the vertical axis of the column.

3. A graphite brick for a nuclear reactor moderator structure as claimed in claim 1, said brick being provided with an end projection having a curved surface including a central minor portion defining a pair of parallel straight edges.

References Cited

UNITED STATES PATENTS

| 2,225,612 | 12/1940 | Allen | 176—84 X |
| 2,852,457 | 9/1958 | Long et al. | 176—84 |
| 2,864,759 | 12/1958 | Long et al. | 176—84 |
| 3,085,958 | 4/1963 | Knights et al. | 176—84 |
| 3,119,746 | 1/1964 | Lemesle et al. | 176—84 X |
| 3,238,106 | 3/1966 | Long et al. | 176—84 X |

FOREIGN PATENTS

| 1,261,010 | 4/1961 | France. |
| 1,270,554 | 7/1961 | France. |

CARL D. QUARFORTH, *Primary Examiner.*

BENJAMIN R. PADGETT, *Examiner.*

M. J. SCOLNICK, *Assistant Examiner.*